(12) United States Patent
Westerhoff et al.

(10) Patent No.: US 9,858,020 B2
(45) Date of Patent: Jan. 2, 2018

(54) PRINTING SYSTEM SUPPORTING UNATTENDED PRINTING AND A METHOD OF UNATTENDED PRINTING BY A PRINTING SYSTEM

(71) Applicant: Océ-Technologies B.V., Venlo (NL)

(72) Inventors: Jurgen Westerhoff, Venlo (NL); Antonius M. Gerrits, Venlo (NL); Vijay A. Kalloe, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/285,074

(22) Filed: Oct. 4, 2016

(65) Prior Publication Data

US 2017/0102905 A1    Apr. 13, 2017

(30) Foreign Application Priority Data

Oct. 12, 2015 (EP) .................................... 15189433

(51) Int. Cl.
*G06F 15/00* (2006.01)
*G06F 3/12* (2006.01)
*H04N 1/00* (2006.01)

(52) U.S. Cl.
CPC .......... *G06F 3/1264* (2013.01); *G06F 3/1203* (2013.01); *G06F 3/1231* (2013.01);
(Continued)

(58) Field of Classification Search
CPC .... G06F 3/1264; G06F 3/1203; G06F 3/1231; H04N 1/00482
(Continued)

(56) References Cited

U.S. PATENT DOCUMENTS 5,036,361 A    7/1991  Filion et al.
8,953,997 B2   2/2015  Van Vliembergen et al.
(Continued)

FOREIGN PATENT DOCUMENTS

EP    1 244 054 A1    9/2002
EP    1 473 661 A1    3/2004
WO   WO 2015/169687 A1    11/2015

*Primary Examiner* — Saeid Ebrahimi Dehkord
(74) *Attorney, Agent, or Firm* — Birch, Stewart, Kolasch & Birch, LLP

(57) ABSTRACT

The invention relates to a printing system for printing a plurality of print jobs, the printing system having a receiving unit for receiving the print jobs, a controller for controlling a scheduling process and a printing process of the print jobs, a print unit for printing the print jobs, a plurality of supply holders for holding supply material for printing, and a user interface for communicating to the operator scheduled supply operator actions. Each of the scheduled supply operator actions is linked to one of the plurality of supply holders. The controller has an establishing unit for establishing a time period of unattended printing of the printing system, and a determination unit for determining scheduled supply operator actions per holder needed to be done before the time period of unattended printing starts. The user interface displays the established time period of unattended printing and the determined supply operator actions per holder. The invention also relates to a method suitable for application in the printing system.

15 Claims, 7 Drawing Sheets

(52) U.S. Cl.
CPC .......... *G06F 3/1256* (2013.01); *G06F 3/1258* (2013.01); *G06F 3/1296* (2013.01); *H04N 1/00482* (2013.01); *H04N 2201/0094* (2013.01)

(58) Field of Classification Search
USPC ........................................................ 358/1.15
See application file for complete search history.

(56) References Cited

U.S. PATENT DOCUMENTS

2002/0057455 A1    5/2002  Gotoh et al.
2014/0368873 A1* 12/2014  Fukuda ................ G06F 3/1203
                                                           358/1.15

* cited by examiner

PRINTING SYSTEM SUPPORTING UNATTENDED PRINTING AND A METHOD OF UNATTENDED PRINTING BY A PRINTING SYSTEM

CROSS-REFERENCE TO RELATED APPLICATIONS

This application claims priority under 35 U.S.C. §119(a) to Application No. 1518433.4, filed in Europe on Oct. 12, 2015, the entire contents of which is hereby incorporated by reference into the present application.

BACKGROUND OF THE PRESENT INVENTION

1. Field of the Invention

The present invention relates to a printing system for printing a plurality of print jobs, the printing system comprising a receiving unit for receiving the plurality of print jobs, a controller for controlling a scheduling process and a printing process of the plurality of print jobs, a print unit for printing the plurality of print jobs, a plurality of supply holders for holding supply material needed to print the plurality of print jobs, and a user interface for communicating to the operator scheduled supply operator actions for printing the plurality of print jobs, each of the scheduled supply operator actions linked to one of the plurality of supply holders.

By the term printing system, a system is meant that has a print function, for example a printer, a copier, a multi-functional, a roll-to-roll printer, a roll-to-sheet printer, a cut sheet printer, a flatbed printer, a wide-format printer, a relief printer or a 3D printer.

A supply material may be a print media material for printing a digital image thereupon. Such a print media material may be paper, plastic, overhead film, transparent material, textile, hard board, wood, etc. The print media material may be in the form of sheets or rolls. The supply material input holder for the print media material may be an input holder for sheets or a roll, for example a tray, a roll holder, etc. The printed print media material is led to at least one output holder.

A supply material may be an image recording material to be deposited on the print media material. Such an image recording material may be toner, metal, ink pearls, ink dreads, ink or other fluidal material. The image recording material may be ejected or adhered in the form of drops or particles. The supply material holder for the image recording material may be a toner container, such as a toner bottle, an ink container for ink pearls, an ink cartridge, an ink bag, etc.

A supply material may be a finishing material used when finishing the printed product. Such a finishing material may be a staple, a paper clip, a binder, glue, or other finishing material. The supply material holder for the finishing material may be a staple holder, a paper clip holder, a binder holder, a glue syringe, etc.

The term holder is equivalent with the term tray in case of a media input holder or a media output holder.

The printing system may be an inkjet printing system, an electro-graphical printing system, a nano-particle printing system, etc. The printing system may be suitable for printing on sheets of print media material, on rolls of print media material, or printing 3D objects.

The present invention further relates to a method for printing a plurality of print jobs by a printing system.

2. Description of Background Art

In prior art printing systems, print jobs submitted to the printing system are scheduled for a predetermined time period. An example of a schedule is described in patent U.S. Pat. No. 8,953,997, which schedule has rows of scheduled print jobs per print media material to be used in the planned period. From this schedule, it is difficult to optimize a period of unattended printing of the printing system, i.e. how long an operator can stay away from the printing system without a stop of the printing system due to a lack of supply material in the supply holders.

SUMMARY OF THE INVENTION

An object of the present invention is to provide a printing system which provides more information to the operator about unattended printing of the printing system.

The object is achieved in a printing system of the above-mentioned kind, wherein the controller comprises an establishing unit for establishing a time period of unattended printing of the printing system, and a determination unit for determining scheduled supply operator actions per holder needed to be done before the time period of unattended printing starts, and the user interface is configured to display the established time period of unattended printing and the determined supply operator actions per holder.

According to an embodiment the establishing unit is configured to establish a start time of the time period of unattended printing. For example, the establishing unit may be configured to receive the start time of the time period of unattended printing by a user action at the user interface or the establishing unit is configured to set the start time of the time period of unattended printing to the current time ("now"). According to an embodiment, the user action at the user interface comprises the step of entering the start time of the time period of unattended printing by a user at the user interface. This is advantageous since the operator can use the time till the established start time to execute the determined supply operator actions.

According to an embodiment, the establishing unit is configured to establish a duration and an end time of the time period of unattended printing. For example, the establishing unit is configured to receive the duration and/or the end time of the time period of unattended printing by a user action at the user interface. According to an embodiment, the user action at the user interface comprises the step of entering the duration and an end time of the time period of unattended printing by a user at the user interface.

This is advantageous, since the operator who knows how long he wants to stay away from the printing system, can tune the length of the time period of unattended printing, and also tune supply operator actions to be executed before he leaves the printing system unattended. For example, when a particular supply holder becomes empty and more supply material from that particular supply holder is needed for the scheduled—not yet executed—print jobs, the operator will be able to fill the supply holder at the appropriate time that he is back again at the printing system after the established end time of the time period of unattended printing.

According to an embodiment, the determination unit is configured to determine a maximum end time for the time period of unattended printing such that none of the scheduled supply operator actions is needed to be done after the start of the time period of unattended printing and before the end of the time period of unattended printing, and the user interface is configured to display the determined maximum end time.

According to an embodiment, upon a change of the start time, the end time and/or the duration of the time period of unattended printing, the determination unit re-determines the corresponding supply operator actions and the re-determined supply operator actions are displayed automatically at the user interface. This is advantageous because the operator gets immediate feedback on the change of the time period of unattended printing and can find a balance between the duration and/or start of the time period of unattended printing and the number of determined supply operator actions to be executed before the start of the time period of unattended printing.

According to an embodiment, the plurality of supply holders comprises at least one media input holder, at least one media output holder, and at least one image recording material holder. The media input holder may comprise print media for printing the print jobs queued in the printing system. The media output holder may comprise printed print media outputted from the print unit of the printing system. The at least one image recording material holder comprises image recording material for recording image data on the print media from the at least one media input holder.

In order to start with the time period of unattended printing, an input holder may be at least partially re-filled, and/or an output holder may be at least partially emptied, and/or an image recording material holder may be at least partially re-filled.

The print media is guided in a paper path from the media input holder to the print unit and from the print unit to the media output holder. An additional media input holder may be used to insert sheets in the paper path before or after the print unit. The insert sheets may be of another kind of media type other than the media type of the print media from a regular input holder.

According to a further embodiment, the plurality of supply holders comprises at least one finishing material holder. A finishing material holder may be positioned at the end of the paper path of the printing system in order to enable inline finishing. In order to start with the time period of unattended printing, a finishing material holder may be at least partially re-filled.

According to an embodiment, the user interface is configured to receive a user input of a requested length of the time period of unattended printing in order to determine a later maximum end time of the time period of unattended printing, and to transfer the start time to the controller.

According to an embodiment, the user interface is configured to receive the start time of the time period of unattended printing by user input, and to transfer the start time to the controller.

According to an alternative embodiment, the establishing unit is configured to establish the start time of the time period of unattended printing to be a moment of time in the future that the at least one supply holder becomes empty.

The present invention is further directed to a method for printing a plurality of print jobs by a printing system, the printing system comprising a plurality of supply holders configured to hold supplies needed to print the plurality of print jobs, and a user interface, the method comprising the steps of receiving the plurality of print jobs at the printing system, scheduling the plurality of print jobs, scheduling supply operator actions for printing the plurality of print jobs, each of the scheduled supply operator actions linked to one of the plurality of supply holders, establishing a time period of unattended printing of the printing system, determining supply operator actions per supply holder which are needed to be executed before the established time period of unattended printing starts, displaying at the user interface, the established time period of unattended printing, and displaying at the user interface the determined supply operator actions per supply holder.

According to an embodiment, the step of establishing the time period of unattended printing of the printing system comprises the step of receiving a start time of the time period of unattended printing by a user action at the user interface by a user entering the start time of the time period of unattended printing at the user interface.

According to an embodiment, the step of establishing the time period of unattended printing of the printing system comprises the step of receiving a duration and/or an end time of the time period of unattended printing by a user action at the user interface by a user entering the duration and/or the end time of the time period of unattended printing, respectively, at the user interface.

The present invention further relates to a computer-program product embodied on a non-transitory computer readable medium and configured to execute a method according to the present invention when executed on a processor.

The present invention further relates to a non-transitory computer readable medium having stored thereon the computer-program product according to the present invention.

BRIEF DESCRIPTIONS OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
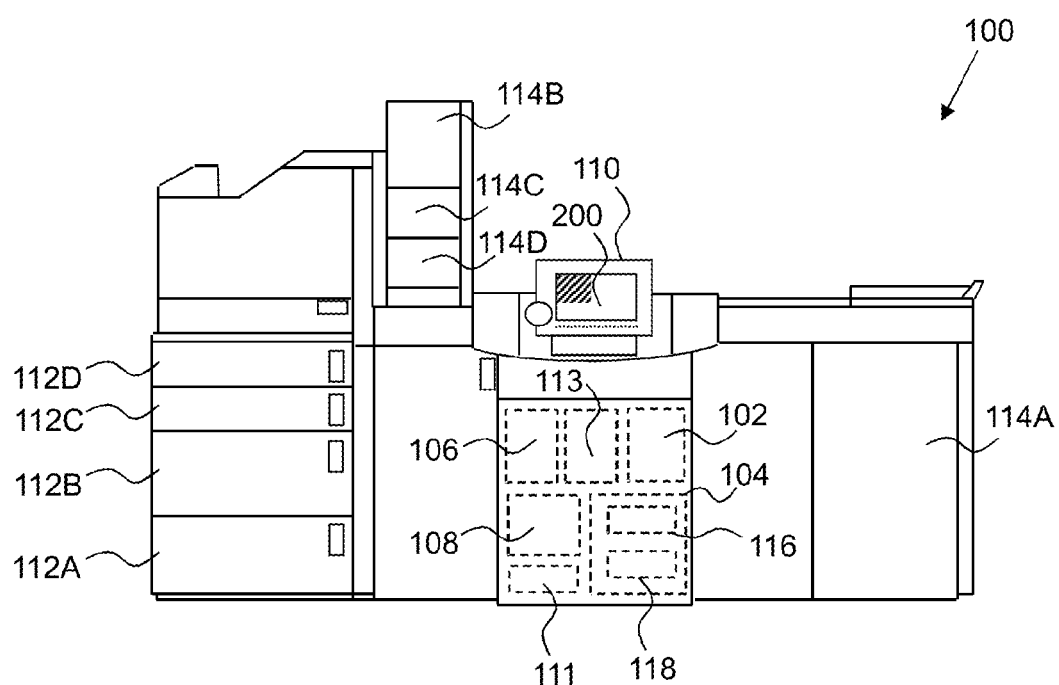
FIG. 1 is a block diagram of a printing system according to the present invention.

As an illustrative example, FIG. 1 shows schematically a printing system 100 for printing a print job. The printing system 100 comprises a receiving unit 102, a controller 104, a print unit 108 and a user interface 110.

The various parts of the printing system 100 are controlled by the controller 104, directly or through the agency of sub-control modules 102, 106, 108, 110, 111, 116, 118. The receiving unit 102 and the print unit 108 are connected to the controller 104, which is also connected to the user interface 110 provided with user interface window 200 with operator control elements and a display element. The display element may be, for example, an LCD screen in the form of a touch screen, for use by an operator at the printing system 100.

When a print job is received by the receiving unit 102, the received print job is rasterized by a raster image processor 106. When the print job is rasterized into a bitmap, the bitmap is positioned in a digital print queue of scheduled print jobs to be printed. When the bitmap arrives at the head of the print queue, the bitmap will be printed by the print unit 108. The print job will be printed on media loaded in at least one of the media input holders 112A-112D. The media is guided along a paper path (not shown) to the print unit 108. The print unit 108 comprises an inkjet print head or a toner assembly for ejecting recording material on the media. The recording material may be toner or ink or any other kind of recording material. The recording material is supplied from a recording material holder 113. After the bitmap is printed on the media, i.e. recording material is deposited on the media, the printed media is guided to at least one of the media output holders 114A-114D. The printed media may also be finished, by a finishing unit 111 comprising a finishing material holder (not shown), for example a staples holder.

The controller 104 is configured to control the rastering process of the print job and the printing process of the rasterized print job. The user interface 110, e.g. a digital work station, is configured to communicate between a user of the printing system 100 and the controller 104. Scheduled supply operator actions for printing the plurality of print jobs may be communicated via the user interface 110. Each of the scheduled supply operator actions is linked to one of the plurality of supply holders, for example, loading or emptying of one of the media input holders 112, loading recording material in the recording material holder 113, emptying one of the media output holders 114, loading of the finishing supply holder in the finishing unit 111.

The controller 104 comprises an establishing unit 116 for establishing a start time for a time period of unattended printing of the printing system, and a determination unit 118 for determining a maximum end time of the time period of unattended printing, such that none of the scheduled supply operator actions is needed to be done after the established start time and before the determined maximum end time. The user interface 110 is configured to display the established start time and the determined maximum end time.

The user interface 110 has a control panel with a display, e.g. in the form of a touch-sensitive screen, which in this example, shows a user interface window 200. The user interface window 200 is shown in detail in FIG. 2.

Figure 2:
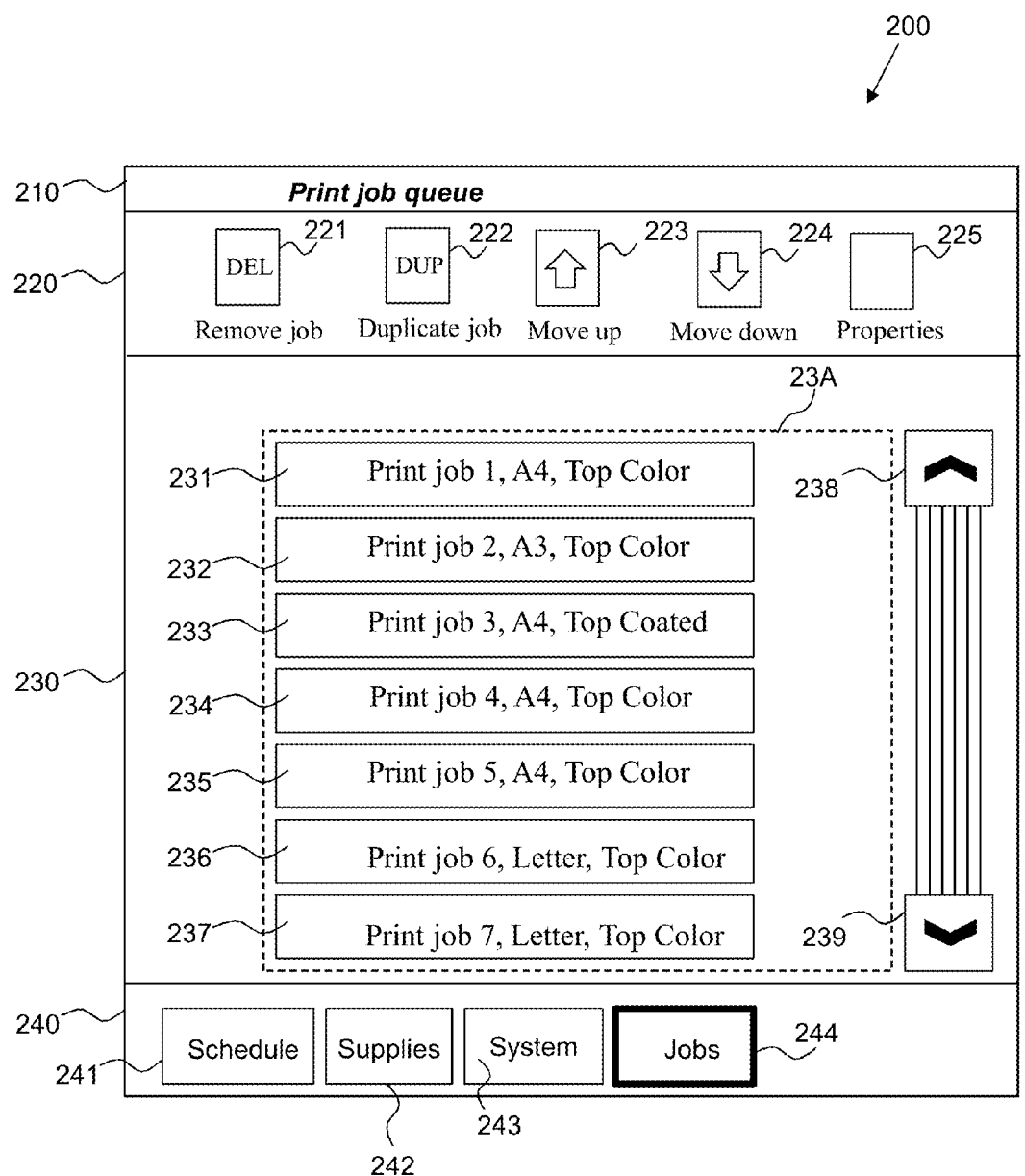
FIG. 2 illustrates a user interface window of the printing system showing a print queue of submitted print jobs according to the present invention.

FIG. 2 shows the user interface window 200 of the printing system 100 according to the present invention. In an alternative embodiment, part of the functionality, including buttons of this user interface window 200, is designed as hardware buttons near the user interface window 200.

The user interface window 200 is opened at the user interface 110 in FIG. 1.

The user interface window 200 comprises a title section 210, a user action section 220, a print queue section 230 and a navigation section 240.

The user action section 220 comprises user operable items 221-225 to be selected for executing actions on one or more selected print jobs in the print queue 23A in the print queue section 230.

A first user operable item 221 represents a job removal action.

A second user operable item 222 represents a job duplication action.

A third user operable item 223 represents a move up action.

A fourth user operable item 224 represents a move down action.

Figure 3:
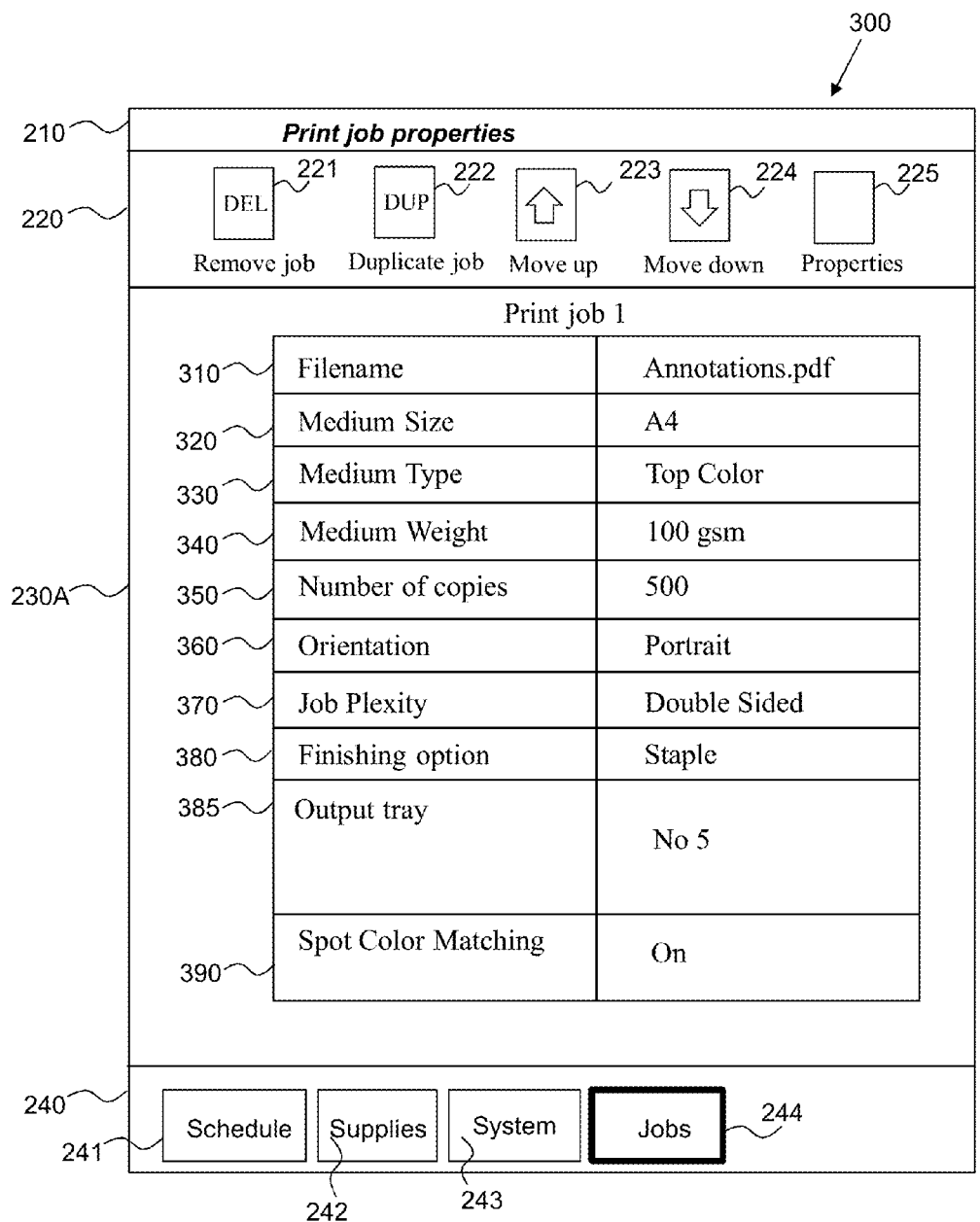
FIG. 3 illustrates a user interface window of the printing system showing print job properties of a print job selected from the print queue according to the present invention.

A fifth user operable item 225 represents an action to retrieve and display properties and settings of a selected print job in a properties window as shown in FIG. 3.

The navigation section 240 comprises a first user operable item 241 for navigating to a schedule with a timeline and media needed for the print jobs, a second user operable item 242 for navigating to an overview of the supplies needed to print the print jobs and the current media content of the input holders 112A-112D (see FIG. 1), a third user operable item 243 for navigating to the system settings, and a fourth user operable item 244 for navigating to the print jobs in the print queue 23A.

The print queue section 230 comprises a representation of the print queue 23A. The print queue 23A may be empty, or comprises at least one print job. FIG. 2 shows a plurality of print jobs 231-237 in the print queue 23A in a sequence order from top to bottom. A first print job 231 will be printed after the current print job (not shown) is finished. A last print job 237 will be printed if the preceding print jobs 231-236 are finished. Each print job 231-237 in the print queue 23A is selectable by a mouse, by a finger, or by a stylus when a touch screen is used as the display element. A sequence order of the print jobs 231-237 in the print queue 23A may be changed by selecting a print job in the print queue 23A, and then activating the third user operable item 223, or the fourth user operable item 224, in order to move the selected print job one position up or down, respectively, in the print queue 23A. In a further embodiment, when a touch screen is used as the display element, a position of a print job 231-237 in the print queue 23A may be changed by dragging and dropping the appropriate print job to another position in the print queue 23A. The print queue 23A is scrollable by activating an upward scrolling button 238, or a downward scrolling button 239. Each print job 231-237 in the print queue 23A may be displayed with a number of properties of the print job, such as an identifying name of the print job ("Print job 1"), a size of the image receiving material to be used for the print job ("A3"), the medium type of the image receiving material ("Red Label"), etc. For convenience reasons, a small relevant number of properties for each print job 231-237 is displayed in the print queue 23A.

FIG. 3 illustrates a display window 300 of a user interface of the printing system showing the print job properties, and settings of print job 231 (shown in FIG. 2) after selecting the first print job 231 and activating the fifth user operable item 225 (shown in FIG. 2).

The print job properties and settings may comprise a file name 310, a medium size 320, a medium type 330, a medium weight 340, a number of copies 350, an orientation 360 (portrait/landscape), a print job plexity indication 370 (single sided/double sided), a finishing option 380 like Staple, Binding, an indicator 385 for an output tray of the printed media of the print job, and a spot color matching indication 390.

Other kind of user operable digital objects for representing print jobs, print job settings, and menu items, may be envisioned on the respective user interface windows shown in FIGS. 2-3.

Figure 4:
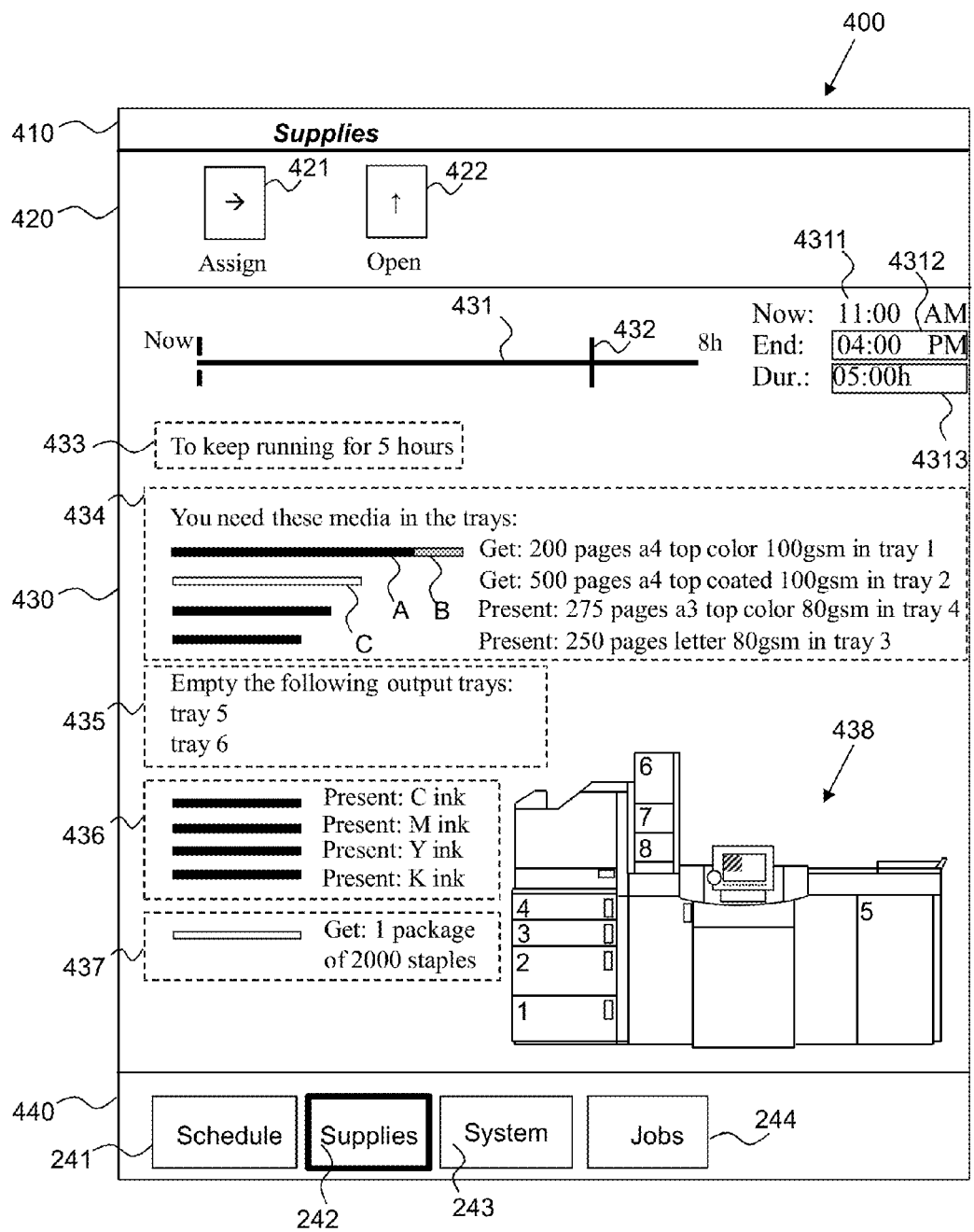
FIG. 4 illustrates a user interface window of the printing system showing a supply overview of the printing system according to the present invention.

FIG. 4 illustrates a display window 400 of a user interface of the printing system showing the supplies in the printing system after activating the second user operable item 242.

The user interface window 200 comprises a title section 410, a user action section 420, a supply section 430 and a navigation section 440.

The user action section 420 comprises user operable items 421-422 to be selected for executing actions on one or more selected media holders 112A-112D, 114A-114D, as shown in FIG. 1. For convenience reasons the media holders 112A-112D, 114A-114D are represented with the numbers 1-8, respectively, in the schematic image 438 of the printing system 100. A first user operable item 421 is used to assign a media type to a selected input holder 1-4. A second user operable item 422 is used to open a selected media input holder 1-4, or a selected media output holder 5-8.

The navigation section 440 resembles the navigation section 240 of FIG. 2. The second user operable item 242 for navigating to an overview of the supplies needed to print the print jobs and the current media content of the input holders 112A-112D is selected, which is shown by a thick border.

According to an embodiment of the present invention, the user interface window 200 displays a time line 431 showing the time from "now" to 8 hours later. The period of 8 hours is set by a system setting and may be changed by the user by navigating to the system settings screen (not shown) by the third user operable item 243.

The time line 431 comprises a user operable vertical bar 432, for example a slider object, indicating a time period of unattended printing, where the time period begins from the "[n]ow," indicator that is shown in FIG. 4 as 11:00 AM. The establishing unit 116, shown in FIG. 1, establishes the start time for the time period of unattended printing of the printing system as 11:00 AM. The user operable vertical bar 432 may be dragged over the time line 431 in order to change the desired time period of unattended printing. In FIG. 4, the user operable vertical bar 432 is positioned at a position on the time line 431 representing a time of 04:00 PM.

The time 4311, at the moment of "[n]ow" is displayed on the user interface window 400, which is the start time of the time period of unattended printing. Entry boxes 4312, 4313 are displayed on the user interface window 400 to show the end time of the time period of unattended printing, and the duration of the time period of unattended printing, respectively. The entry boxes 4312, 4313 may be used by the operator to enter a desired end time and/or a desired duration. When a value in one of the entry boxes 4312, 4313 is changed, the vertical bar 432 will be automatically moved to a position on the time line 431 corresponding to the changed value.

A message 433 is displayed on the user interface window 400 to indicate a duration of the time period of 5 hours from "now" to the operable vertical bar 432, representing 04:00 PM in FIG. 4, for keeping the printing system running without the need for operator intervention.

When dragging the vertical bar 432, the determination unit 118, shown in FIG. 1, determines the supply operator actions needed to be executed in order to achieve the desired time period of unattended printing. The supply operator actions are categorized into a first supply category 434 with respect to the media input holders, a second supply category 435 with respect to the media output holders, a third supply category 436 with respect to the recording material holders, and a fourth supply category 437 with respect to finishing material holders.

The controller is configured to store the actual status of each of the supply holders, i.e., amounts of the supplies in the supply holders. The media amount present in a media input holder or media output holder, the recording material amount in a recording material holder, and the finishing material amount in a finishing material holder is determined by sensing, using sensors of the printing system, or by estimating, using the controller of the printing system.

The controller comprises a print job queue and determines the amount of supplies to be used for printing the print jobs in the print job queue. Each print job comprises information items regarding the number of copies of the print job, the number of pages in one copy, and the plexity, simplex or duplex, of the print job, and information items of the medium types used in the print job. The information items further includes the print velocity of the printing unit for simplex printing and duplex printing, and the weight of the media, which is known to the controller.

By using these information items, the determination unit 118 is able to determine at which moments in time supply operator actions are needed, such as refilling a media input holder, emptying a media output holder, refilling or replacing a recording material holder, and refilling or replacing a finishing material holder. The first moment in time from "now" that a supply operator action is needed, determines a time period of unattended printing without any supply operator action to be executed.

However, the desired time period of unattended printing may be larger than the time period from "now" to that first moment in time. Therefore the determination unit 118 lists the supply operator actions needed to be executed to achieve the desired time period of unattended printing by the user operable vertical bar 432. The lists of needed supply operator actions are displayed in the blocks 434-437 in the user interface window 400. When dragging the user operable vertical bar 432 to the right side of the time line 431 towards the 8 hours, the number of needed supply operator actions may often increase. In this way the operator can find a balance in the number of needed supply operator actions and the desired time period of unattended printing.

The first category block 434 shows a horizontal bar for each media input holder 1-4. The first horizontal bar corresponds to tray 1, and comprises a dark colored part A of the media present in tray 1 at the moment "now," and a gray colored part B of the media needed to be entered in tray 1, to achieve the time period of 5 hours of unattended printing. Next to the first horizontal bar, the amount of 200 pages "a4 top color 100 gsm," are displayed to be entered in tray 1. The colored part B is gray, because the amount of 200 pages does not lead to an immediate stop of the printing system, since there is an amount of 800 pages already present in tray 1 according to dark colored part A, but needs to be entered to achieve the 5 hours time period of unattended printing. The second horizontal bar corresponds to tray 2, and comprises a white colored part C indicating that tray 2 is empty, and that there is a shortage of an amount of 500 pages "a4 top coated 100 gsm" in tray 2 in order to achieve the 5 hours time period of unattended printing. The operator has to fill tray 2 with the amount of 500 pages as indicated next to the second horizontal bar. The third horizontal bar corresponds to tray 4, and comprises a dark colored part indicating an amount of media present in tray 4 which is sufficient for achieving the 5 hours time period of unattended printing. The fourth horizontal bar corresponds to tray 3 and comprises a dark colored part indicating an amount of media present in tray 3 which is sufficient for achieving the 5 hours time period of unattended printing.

The order of the horizontal bars is preferably corresponding to a decreasing time of the supply operator actions, and/or a decreasing amount of media to be loaded by the operator.

The colors black, gray, and white represent a present media amount in a tray, a media amount to be loaded in an non-empty tray, and media amounts to be loaded in an empty tray, respectively may be replaced by other colors such as preferably green, orange and red respectively.

The second category block 435 shows a message for each media output holder of the media output holders 5-8 which is relevant, i.e., for which a supply operator action is determined by the determination unit 118 in order to achieve the 5 hours time period of unattended printing. A first supply operator action is mentioned for emptying tray 5 and second operator supply action is mentioned for emptying tray 6. No actions are required for trays 7 and 8 to achieve the 5 hours time period of unattended printing.

The third category block 436 shows a horizontal bar for each recording material holder in the printing system. The printing system comprises a CMYK provision of ink holders. Other provisions for ink or toner may be envisioned within the scope of the present invention. A first horizontal bar represents the amount of C ink present in the C ink holder. A second horizontal bar represents the amount of M ink present in the M ink holder. A third horizontal bar represents the amount of Y ink present in the Y ink holder. A fourth horizontal bar represents the amount of K ink present in the K ink holder. The horizontal bars are dark colored to indicate that the amount of ink is sufficient in all ink holders for achieving the 5 hours time period of unattended printing.

The fourth category block 437 shows a horizontal bar for each finishing material holder in the printing system. In this example the printing system comprises a staples holder, which needs to be filled with 1 package of 2000 staples in order to achieve the 5 hours time period of unattended printing.

In another embodiment, the top-down order of first category block 434, the second category block 435, the third category block 436, and the fourth category block 437 in the user interface window 400 is determined by the urgency of the needed supply operator actions in each category block. The urgency may be determined by the originally scheduled moments in time for the appropriate supply operator actions.

The top-down order of supply operator actions within one category block may also be determined by the urgency of each supply operator action in the one category block.

Some supply operator actions may be a combination of supply operator actions in two or more category blocks. For example, a media input holder may comprise a medium type that is not used for the subsequent print jobs, and therefore the medium type needs to be replaced by another medium type to be used in the subsequent print jobs. A combined supply operator action of a first supply operator action of emptying the media input holder, and a second supply operator action of filling the media input holder by the other medium type, will be entered in at least one of the first category block 434, and the second category block 435, or mentioned in a separate category block (not shown).

Figure 5:
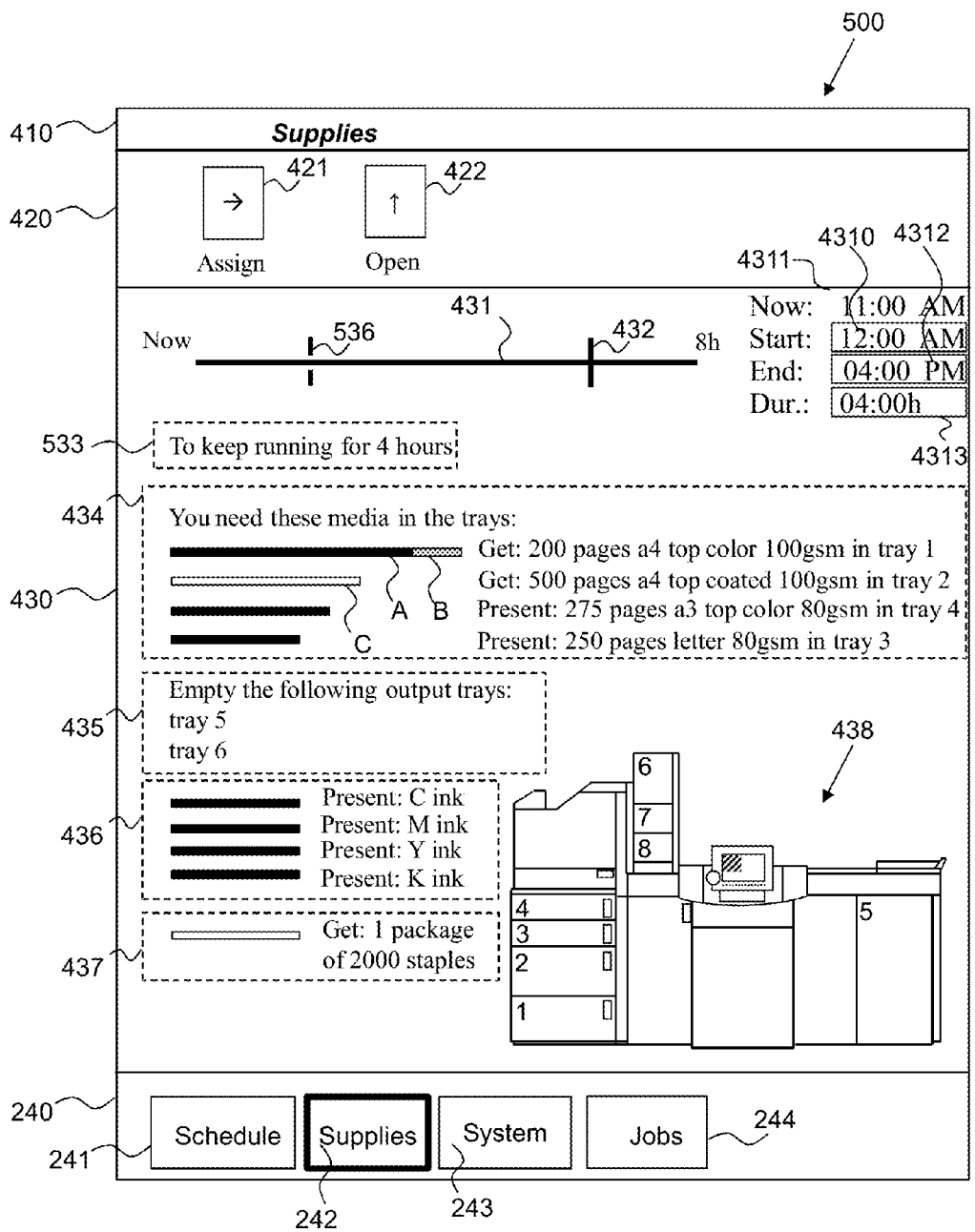
FIG. 5 illustrates a further embodiment of the user interface window of the printing system shown in FIG. 4.

FIG. 5 shows a further embodiment of the printing system according to the present invention. According to this further embodiment, the start time of the desired time period of unattended printing is settable by the operator, by a second user operable vertical bar 536. By dragging the second vertical bar 536 along the horizontal time line 431 the start moment of the desired time period of unattended printing is established by the establishing unit 116. The possibility to select the start time gives the operator more freedom in planning the time period of unattended printing. For example, if the operator wants a break between 12:00 AM and 01:00 PM and the actual time is 11:00 AM, he can put the start time at 12:00 AM and the end time at 01:00 PM using by the second vertical bar 536, and first vertical bar 432, respectively.

According to this embodiment, an entry box 4310 is added, which may be used by the operator to enter a desired start time deviating from the moment "[n]ow". When a value in the entry box 4310 is changed, the second user operable vertical bar 536 will be automatically moved to a position on the time line 431 corresponding to the changed value of the start time of the time period of unattended printing. Accordingly, the value in the entry box 4313 of the duration of the time period of unattended printing will be automatically changed.

In FIG. 5, a message 533 is displayed on the user interface window 500 to indicate a duration of the time period of 4 hours from 12:00 AM to 04:00 PM for keep running the printing system without operator intervention. When the second vertical bar 536 showing the start time 12:00 AM of the time period of unattended printing, and the first vertical bar 432 showing the end time 04:00 PM of the time period of unattended printing are positioned by the operator, the determination unit 118 determines supply operator actions needed to be executed in order to achieve the time period of unattended printing from the start time indicated by the second vertical bar 536 and the end time indicated by the first vertical bar 432.

Figure 6:
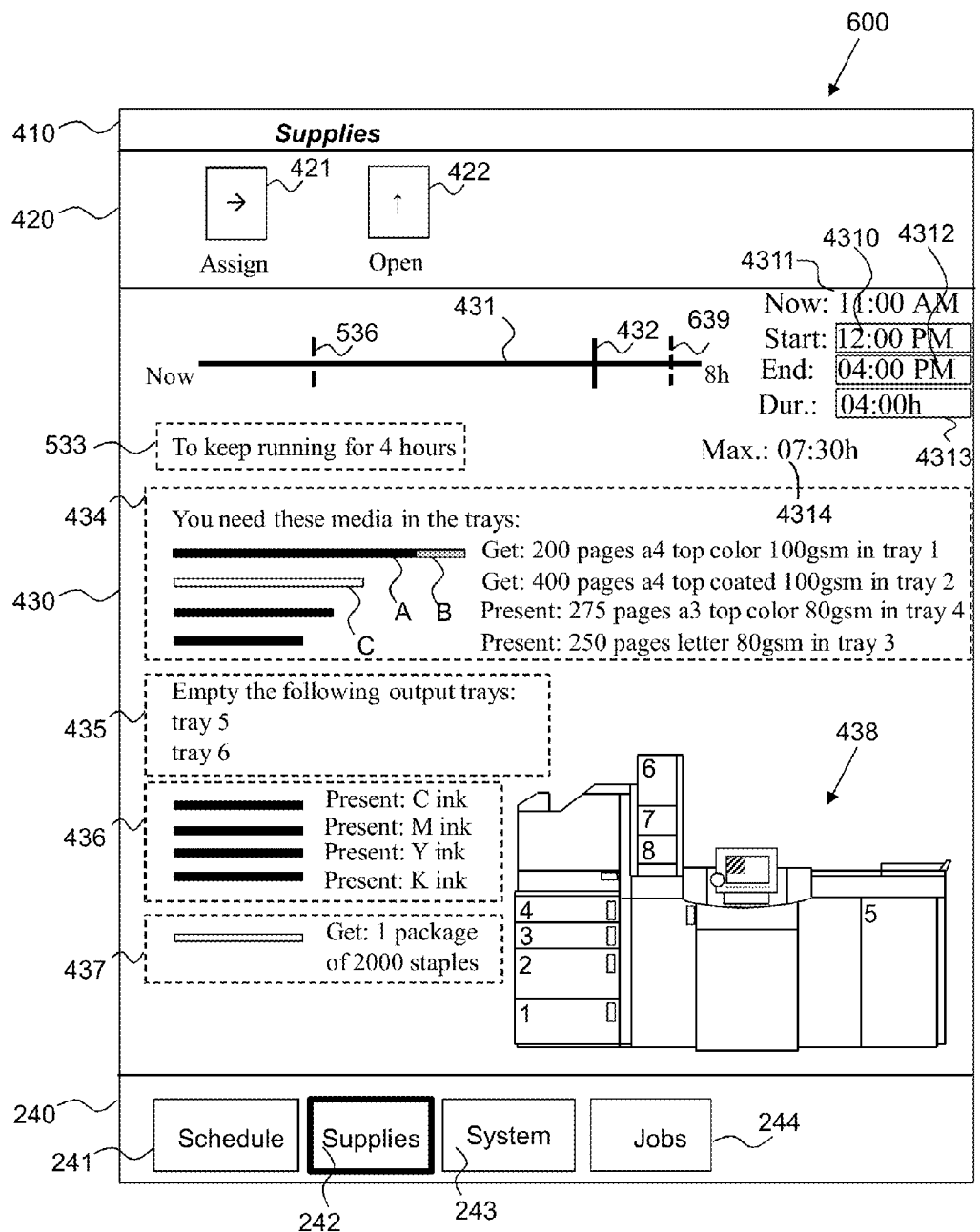
FIG. 6 illustrates a further embodiment of the user interface window of the printing system shown in FIG. 5.

FIG. 6 shows a further embodiment of the printing system according to the present invention. According to this further embodiment, the determination unit 118 determines a maximum end time for a time period of unattended printing from a start time indicated by the vertical bar 536 on the time line 431 in the user interface window 600 of the printing system. The maximum end time is indicated on the time line 431 by a third vertical bar 639. Since the third vertical bar 639 indicates that the maximum end time is beyond the first vertical bar 432, which indicates the end time of the time period of unattended printing entered by the operator, the operator may drag the first vertical bar 432 to the position of the third vertical bar 639. According to an embodiment, the dragging of the first vertical bar 432 is blocked when trying to drag the first vertical bar 432 beyond the third vertical bar 639 indicating the maximum end time.

The maximum end time is at least determined by the printing configuration of the printing system, the speed of print media to be printed, and the number of print jobs in the print queue of the printing system. For example, if the total number of sheets to be printed is equal to 10000, and the speed of printing is equal to 100 sheets per minute, the maximum end time is 100 minutes from the start time of the time period of unattended printing.

According to this embodiment, a display item 4314 is added to the user interface window 600. The display item 4314 shows the maximum possible duration of a time period of unattended printing from the desired start time indicated by the second vertical bar 536 to the determined maximum end time indicated by the third vertical bar 639. When a value in the entry box 4310 is changed, or the second user operable vertical bar 536 is moved on the time line 431, the determination unit 118 will re-determine the maximum end time. A value for the duration of the time period of unattended printing will be calculated by the determination unit accordingly. The value in the display item 4314 will automatically be adapted to the calculated duration. The third vertical bar 639 will also automatically moved to a position on the time line 431 corresponding to re-determined maximum end time.

In FIGS. 4, 5 and 6, the first vertical bar 432, the second vertical bar 536 and the third vertical bar 639 are distinguishable by a dashing pattern in the bars. Other ways of presenting the vertical bars, which make the vertical bars visually distinguishable from each other, are envisioned and part of the present invention.

Instead of using entry boxes 4310, 4312, 4313 and display items 4311, 4314 in FIG. 4-6, the time line 431 may be changed using the vertical bars 536, 431, 639. A duration of the time period of unattended printing may also be displayed along and/or beneath the time line 431.

In some cases, the maximum end time may be calculated to be earlier a desired end time of the time period of unattended printing. In this instance, the operator may then adapt the desired end time to the maximum end time, or the operator may postpone the start time of the time period of unattended printing.

The start time, end time, and maximum end time may be in a usual date-time format, in correspondence with the current internal date-time setting of the printing system 100 in the controller 104.

Figure 7:
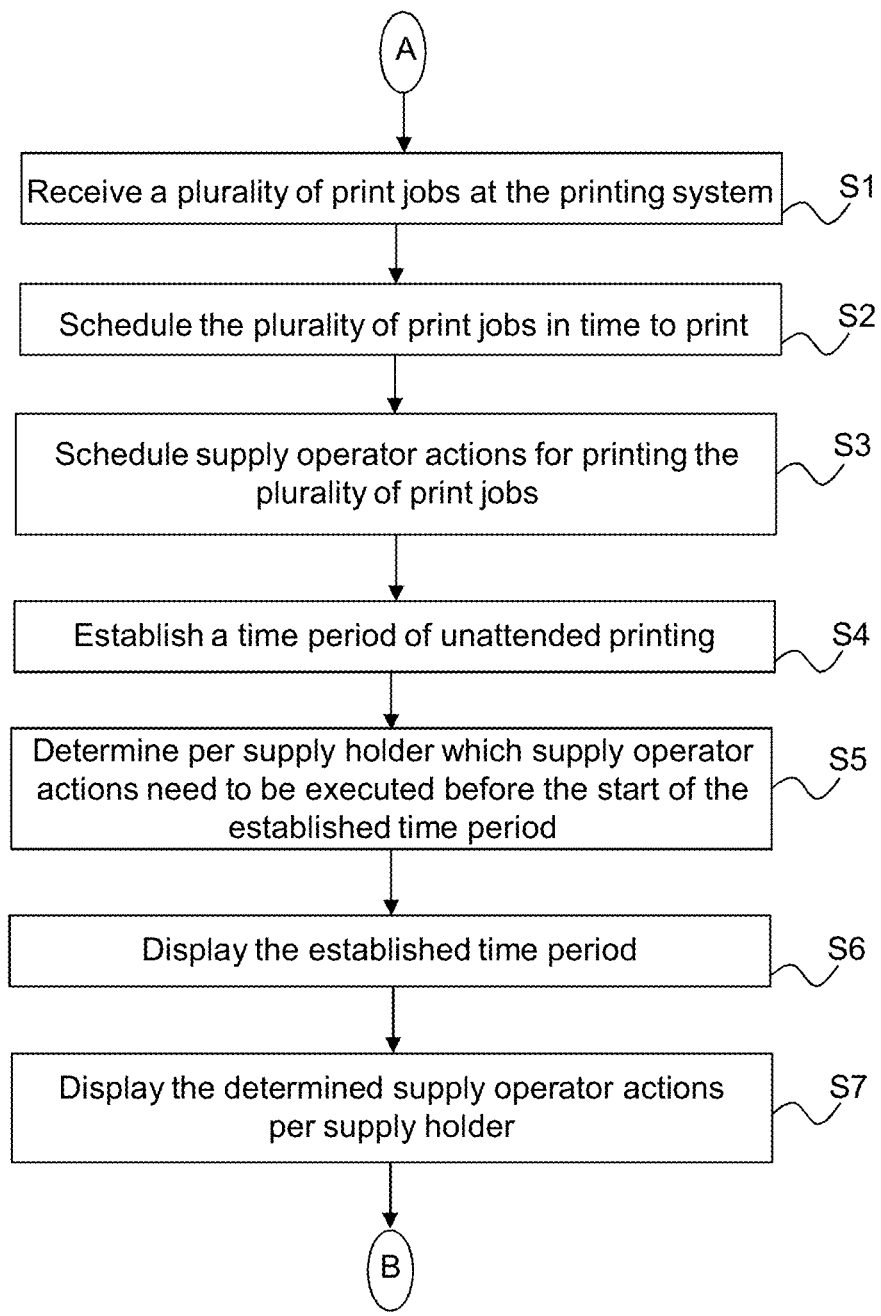
FIG. 7 is a flow diagram of an embodiment of the method according to the present invention.

In another embodiment, a method for printing using a printing system is shown in FIG. 7. A starting point A in FIG. 7 leads to a first step S1.

In the first step S1, a plurality of print jobs is received at the printing system. The receiving unit of the printing system is configured to receive the plurality of print jobs, and to store the received plurality of print jobs in a digital storage of the printing system, for example, a digital storage in the controller of the printing system.

In a second step S2, the plurality of print jobs is scheduled in time and submitted to a print job queue for the print unit of the printing system.

In a third step S3, supply operator actions are scheduled for printing the plurality of print jobs. Each of the scheduled supply operator actions is linked to one of the plurality of supply holders.

In a fourth step S4, a time period of unattended printing of the printing system is established. The establishment may be calculated automatically by the controller based on the print job properties, the document properties in the print jobs, the print velocity of the printing system and actual amounts of supplies in the supply holders at the start of the time period. The establishment may be determined by user input at the user interface of the printing system of a start time, an end time, and/or a duration of the time period of unattended printing.

In a fifth step S5, it is determined per supply holder which supply operator actions need to be executed before the established time period of unattended printing starts.

In a sixth step S6, the established time period of unattended printing is displayed at the user interface.

In a seventh step S7, the determined supply operator actions are displayed per supply holder at the user interface. According to a preferred embodiment, the established time period of unattended printing and the determined supply operator actions are displayed at a same window of the user interface of the printing system. However, displaying the established time period of unattended printing and the determined supply operator actions on different windows of the user interface of the printing system is also part of the present invention.

Upon a change of the established time period of unattended printing by a user action at the user interface, the fifth step S5, the sixth step S6 and the seventh step S7 are repeated.

The method ends in the end point B.

Detailed embodiments of the present invention are disclosed herein, however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

What is claimed is:

1. A printing system for printing a plurality of print jobs, the printing system comprising:
a controller for controlling a scheduling process and a printing process of the plurality of print jobs;
a printer for printing the plurality of print jobs;
a plurality of supply holders for holding supply material needed to print the plurality of print jobs; and
a user interface for communication to the operator of scheduled supply operator actions for printing the plurality of print jobs, each of the scheduled supply operator actions linked to one of the plurality of supply holders;
wherein the controller is configured to:
receive the plurality of print jobs;
establish a time period of unattended printing of the printing system; and
deteimine scheduled supply operator actions per holder needed to be done before the time period of unattended printing starts,
wherein the user interface is configured to display the established time period of unattended printing and the determined supply operator actions per holder,
wherein the controller is configured to establish a start time of the period of unattended printing,
wherein the user interface is configured to receive a user action at the user interface of entering the start time of the time period of unattended printing at the user interface by user, and
wherein the controller is further configured to determine a maximum end time for the time period of unattended printing such that none of the scheduled supply operator actions is needed to be performed after the start time of the time period of unattended printing and before the maximum end time of the time period of unattended printing, and the user interface is configured to display the determined maximum end time.

2. The printing system according to claim 1, wherein the controller is configured to set the start time of the time period of unattended printing to the current time.

3. The printing system according to claim 1, wherein the controller is configured to establish a duration and an end time of the time period of unattended printing.

4. The printing system according to claim 3, wherein the controller is configured to receive the duration and/or the end time of the time period of unattended printing by a user action at the user interface, and
wherein the user interface is configured to receive the user action at the user interface of entering the duration and/or the end time of the time period of unattended printing at the user interface by a user.

5. The printing system according to claim 1, wherein, upon a change of the start time, the end time and/or the duration of the time period of unattended printing, the controller re-determines the corresponding supply operator actions and the re-determined supply operator actions are displayed automatically at the user interface.

6. The printing system according to claim 1, wherein the plurality of supply holders comprises at least one media input holder, at least one media output holder, and at least one image recording material holder.

7. The printing system according to claim 6, wherein the plurality of supply holders comprises at least one finishing material holder.

8. The printing system according to claim 1, wherein the maximum end time of the time period of unattended printing is displayed near the start and end time of the time period.

9. The printing system according to claim 1, wherein the operator will be prohibited to change the end time into a time beyond the maximum end time in the user interface.

10. A method for printing a plurality of print jobs by a printing system, the printing system comprising a plurality of supply holders configured to hold supplies needed to print the plurality of print jobs, and a user interface, the method comprising the steps of:
receiving a plurality of print jobs at a controller of the printing system;
scheduling, via the controller, the plurality of print jobs in time;
scheduling, via the controller, supply operator actions for printing the plurality of print jobs, each of the scheduled supply operator actions linked to one of the plurality of supply holders;
establishing, via the controller, a time period of unattended printing of the printing system;
determining, via the controller, supply operator actions per supply holder which are needed to be executed before the established time period of unattended printing starts;
displaying at the user interface the established time period of unattended printing;
displaying at the user interface the determined supply operator actions per supply holder; and
unattended printing of the scheduled print jobs,
wherein the step of establishing the time period of unattended printing of the printing system comprises the step of receiving a start time of the time period of unattended printing by a user action of entering the start time at the user interface,
wherein the step of establishing the time period of unattended printing of the printing system comprises determining a maximum end time for the time period of unattended printing such that none of the scheduled supply operator actions is needed to be performed after the start time of the time period of unattended printing and before the maximum end time for the time period of unattended printing, and
wherein the step of displaying at the user interface the established time period of unattended printing comprises displaying the determined maximum end time.

11. The method according to claim 10, wherein the step of establishing the time period of unattended printing of the printing system comprises the step of receiving a duration and/or an end time of the time period of unattended printing by a user action of entering the duration and/or the end time at the user interface.

12. A computer program product embodied on a non-transitory computer readable medium and configured to execute the method of claim 10 when executed on a processor.

13. A non-transitory computer readable medium having stored thereon the computer-program product according to claim 12.

14. The method according to claim 10, wherein the maximum end time of the time period of unattended printing is displayed near the start and end time of the time period.

15. The method according to claim 10, wherein the operator will be prohibited to change the end time into a time beyond the maximum end time in the user interface.

* * * * *